(12) United States Patent
Barhorst et al.

(10) Patent No.: US 9,199,341 B2
(45) Date of Patent: Dec. 1, 2015

(54) SYSTEMS AND METHODS FOR WELDING ELECTRODES

(75) Inventors: Steven Barhorst, Sidney, OH (US); Mario Amata, Dublin, OH (US); Kevin Pagano, Algonquin, IL (US)

(73) Assignee: HOBART BROTHERS COMPANY, Troy, OH (US)

( * ) Notice: Subject to any disclaimer, the term of this patent is extended or adjusted under 35 U.S.C. 154(b) by 167 days.

(21) Appl. No.: 13/596,713

(22) Filed: Aug. 28, 2012

(65) Prior Publication Data

US 2014/0061175 A1 Mar. 6, 2014

(51) Int. Cl.
*B23K 35/02* (2006.01)
*B23K 35/36* (2006.01)
*B23K 35/32* (2006.01)

(52) U.S. Cl.
CPC ......... *B23K 35/3601* (2013.01); *B23K 35/0261* (2013.01); *B23K 35/0266* (2013.01); *B23K 35/325* (2013.01)

(58) Field of Classification Search
USPC ............... 219/145.1, 146.22, 146.1, 137 WM
See application file for complete search history.

(56) References Cited

U.S. PATENT DOCUMENTS

| | | |
|---|---|---|
| 2,870,047 A | 1/1959 | Kee |
| 3,036,205 A | 5/1962 | Aida |
| 3,107,176 A | 10/1963 | Witherell |
| 3,167,450 A | 1/1965 | Koibuchi |
| 3,318,729 A | 5/1967 | Siegle |
| 3,345,495 A | 10/1967 | Quaas |
| 3,452,419 A | 7/1969 | Hillert |
| 3,453,142 A | 7/1969 | Dorschu |
| 3,491,225 A | 1/1970 | Oku |
| 3,519,783 A | 7/1970 | Forsberg |
| 3,533,152 A | 10/1970 | Gloor |
| 3,542,998 A | 11/1970 | Huff |
| 3,554,792 A | 1/1971 | Johnson |
| 3,558,851 A | 1/1971 | Oku |
| 3,559,864 A | 2/1971 | Hillert |
| 3,560,702 A | 2/1971 | Arikawa |
| 3,643,061 A | 2/1972 | Duttera |
| 3,778,588 A | 12/1973 | Bishel |
| 3,805,016 A | 4/1974 | Soejima |
| 3,818,178 A | 6/1974 | Nakabayashi |
| 3,947,655 A | 3/1976 | Gonzalez |
| 4,122,238 A | 10/1978 | FrantzerbSr |

(Continued)

FOREIGN PATENT DOCUMENTS

| | | |
|---|---|---|
| EP | 0652071 | 5/1995 |
| EP | 0688630 | 8/2001 |

(Continued)

OTHER PUBLICATIONS

U.S. Appl. No. 61/651,279, filed May 24, 2012, Amata et al.

(Continued)

*Primary Examiner* — Brian Jennison
(74) *Attorney, Agent, or Firm* — Fletcher Yoder P.C.

(57) ABSTRACT

The invention relates generally to welding and, more specifically, to welding wires for arc welding, such as Gas Metal Arc Welding (GMAW) or Flux Core Arc Welding (FCAW). In one embodiment, a tubular welding wire includes a sheath and a core, in which the sheath includes less than approximately 0.06% carbon by weight. The core includes a carbon source and a potassium source that together comprise less than 10% of the core by weight.

18 Claims, 2 Drawing Sheets

(56) References Cited

U.S. PATENT DOCUMENTS

| | | | |
|---|---|---|---|
| 4,343,984 | A | 8/1982 | Smith |
| 4,551,610 | A | 11/1985 | Amata |
| 4,662,952 | A | 5/1987 | Barringer |
| 4,689,461 | A | 8/1987 | Gamberg |
| 4,721,837 | A | 1/1988 | Gamberg |
| 5,218,757 | A | 6/1993 | Kaneko |
| 5,580,475 | A * | 12/1996 | Sakai et al. ............... 219/145.22 |
| 5,898,022 | A | 4/1999 | Maples |
| 6,339,209 | B1 | 1/2002 | Kotecki |
| 6,723,954 | B2 | 4/2004 | Nikodym et al. |
| 6,940,042 | B2 | 9/2005 | Hara |
| 7,087,859 | B2 | 8/2006 | Burt |
| 7,087,860 | B2 | 8/2006 | Nikodym et al. |
| 7,807,948 | B2 | 10/2010 | Katiyar |
| 7,812,284 | B2 | 10/2010 | Narayanan |
| 8,758,901 | B2 | 6/2014 | Nakamura |
| 2002/0153364 | A1 | 10/2002 | North |
| 2004/0187961 | A1 | 9/2004 | Crockett |
| 2005/0121110 | A1 | 6/2005 | Dallam |
| 2006/0096966 | A1 | 5/2006 | Munz |
| 2006/0207984 | A1 | 9/2006 | Karogal |
| 2006/0255027 | A1 | 11/2006 | Katiyar |
| 2006/0261054 | A1 | 11/2006 | Katiyar |
| 2006/0283848 | A1 | 12/2006 | Karogal |
| 2009/0039065 | A1 | 2/2009 | Nakamura |
| 2009/0321404 | A1 * | 12/2009 | Keegan .................... 219/145.23 |
| 2010/0147818 | A1 | 6/2010 | Fondriest |
| 2011/0240604 | A1 | 10/2011 | Panday |

FOREIGN PATENT DOCUMENTS

| | | |
|---|---|---|
| EP | 2110195 | 10/2009 |
| EP | 1775060 | 11/2011 |
| GB | 363815 | 12/1931 |
| GB | 863072 | 3/1961 |
| GB | 1497347 | 1/1978 |
| JP | 57159294 | 10/1982 |
| JP | S60257992 | 12/1985 |
| WO | 2005115680 | 12/2005 |
| WO | 2008004699 | 1/2008 |

OTHER PUBLICATIONS

U.S. Appl. No. 13/418,148, filed Mar. 12, 2012, Barhorst et al.
U.S. Appl. No. 61/625,488, filed Apr. 17, 2012, Barhorst et al.
Arc Welding Automotive Components, Chrysler Group LLC Process Standard Category Code: D-1, Sep. 8, 2009, pp. 1-16.
International Search Report from PCT application No. PCT/US2013/056907 dated Dec. 13, 2013, 14 pgs.
International Search Report from PCT application No. PCT/US2013/074533 mailed Sep. 30, 2014, 16 pgs.
International Search Report from PCT application No. PCT/US2013/074536, dated Sep. 29, 2014, 6 pgs.
Anonymous; "Sodium Carbonate," Wikipedia, the Free Encyclodedia, http://en.wikipedia.org/wiki/Sodium_carbonate [retrieved on Aug. 5, 2015].

* cited by examiner

SYSTEMS AND METHODS FOR WELDING ELECTRODES

BACKGROUND

The invention relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process, while others (e.g., Flux Core Arc Welding (FCAW), Submerged Arc Welding (SAW), and Shielded Metal Arc Welding (SMAW)) do not. Additionally, certain types of welding may involve a welding electrode in the form of welding wire. Welding wire may generally provide a supply of filler metal for the weld as well as provide a path for the current during the welding process. Furthermore, certain types of welding wire (e.g., tubular welding wire) may include one or more components (e.g., flux, arc stabilizers, or other additives) that may generally alter the welding process and/or the properties of the resulting weld.

BRIEF DESCRIPTION

In one embodiment, a tubular welding wire includes a sheath and a core, in which the sheath includes less than approximately 0.06% carbon by weight. The core includes a carbon source and a potassium source that together comprise less than 10% of the core by weight.

In another embodiment, a welding method includes feeding a welding wire electrode into a welding apparatus. The welding wire electrode includes a core and a sheath, in which the sheath includes less than approximately 0.05% carbon by weight. Furthermore, the core includes a carbon source and an alkaline metal or alkaline earth metal stabilizer that together comprise less than 10% of the core by weight. The method further includes forming a welding arc between the welding wire electrode and a coated metal workpiece.

In another embodiment, a welding system includes a welding torch configured to receive a welding wire electrode. The welding wire electrode includes a carbon source and a metal source that together comprise less than 10% of the welding wire electrode by weight. Furthermore, the welding wire has a metal sheath includes less than 0.04% carbon by weight. Furthermore, the metal source comprises an alkali metal source, an alkaline earth metal source, or any combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As mentioned, certain types of welding electrodes (e.g., tubular welding wire) may include one or more components (e.g., flux, arc stabilizers, or other additives) that may generally alter the welding process and the properties of the resulting weld. The presently disclosed welding electrode embodiments include a metal sheath having lower carbon content than other welding electrodes. As set forth in detail below, the lower carbon content in the metal strip of the presently disclosed tubular welding wires enables, for example, a lower spatter rate, reduced welding fumes, and/or reduced penetration into the workpiece during welding. Accordingly, the presently disclosed metal strip enhances the weldability of thinner workpieces (e.g., 20-, 22-, 24-gauge, or thinner workpieces) and/or coated workpieces, even at high travel speed (e.g., greater than 30 in/min). Furthermore, in addition to the aforementioned metal sheath, the presently disclosed welding wires include filler compositions that may incorporate various forms of carbon, alkali metal compounds, alkaline earth metal compounds, as well as other elements (e.g., titanium, manganese, or similar elements) and minerals (e.g., rare earth silicide, pyrite, magnetite, and so forth). Additionally, the disclosed welding electrodes generally enable acceptable welds under different welding configurations (e.g., direct current electrode negative (DCEN), direct current electrode positive (DCEP), and so forth) and/or different welding methods (e.g., involving circular or serpentine welding electrode movements during welding).

It should be appreciated that, as used herein, the term "tubular welding electrode" or "tubular welding wire" may refer to any welding wire or electrode having a metal sheath and a granular or powdered core, such as metal-cored or flux-cored welding electrodes. It should also be appreciated that the term "stabilizer" may be generally used to refer to any component of the tubular welding that improves the quality of the arc and/or the weld.

Figure 1:
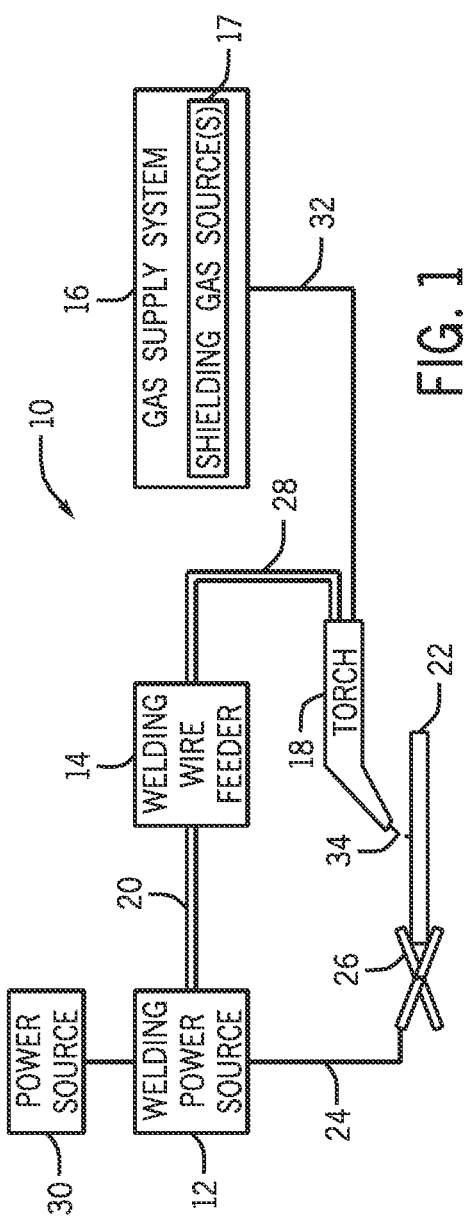
FIG. 1 is a block diagram of a gas metal arc welding (GMAW) system, in accordance with embodiments of the present disclosure.

Turning to the figures, FIG. 1 illustrates an embodiment of a gas metal arc welding (GMAW) system 10 that utilizes a welding electrode (e.g., tubular welding wire) in accordance with the present disclosure. It should be appreciated that, while the present discussion may focus specifically on the GMAW system 10 illustrated in FIG. 1, the presently disclosed welding electrodes may benefit any arc welding process (e.g., FCAW, FCAW-G, GTAW, SAW, SMAW, or similar arc welding process) that uses a welding electrode. The welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (i.e., the welding electrode) and power to the welding torch 18 during operation of the welding system 10. In another embodiment, the welding power unit 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed welding electrodes (e.g., tubular welding wire) may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, Ar/$CO_2$ mixtures, Ar/$CO_2$/$O_2$ mixtures, Ar/He mixtures, and so forth.

Accordingly, the illustrated welding torch 18 generally receives the welding electrode (i.e., the tubular welding wire), power from the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the welding electrode (i.e., the tubular welding wire), the chemistry of the arc 34 and/or the resulting weld (e.g., composition and physical characteristics) may be varied. For example, the welding electrode may include fluxing or alloying components that may act as arc stabilizers and, further, may become at least partially incorporated into the weld, affecting the mechanical properties of the weld. Furthermore, certain components of the welding electrode (i.e., welding wire) may also provide additional shielding atmosphere near the arc, affect the transfer properties of the arc 34, and/or deoxidize the surface of the workpiece.

Figure 2:
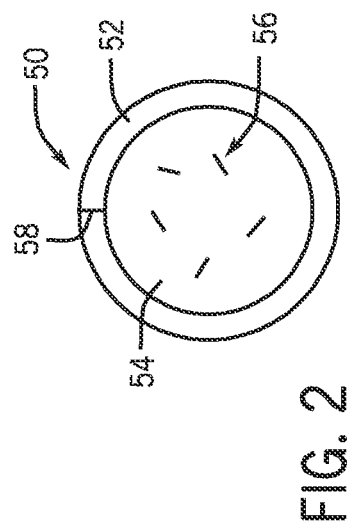
FIG. 2 is a cross-sectional view of a tubular welding electrode, in accordance with embodiments of the present disclosure.

A cross-section of an embodiment of the presently disclosed welding wire is illustrated in FIG. 2. FIG. 2 illustrates a tubular welding wire 50 that includes a metallic sheath 52, which encapsulates a granular or powdered core 54 (also referred to as filler). The metallic sheath 52 may be manufactured from any suitable metal or alloy, such as steel. It should be appreciated that the composition of the metallic sheath 52 may affect the composition of the resulting weld and/or the properties of the arc 34. As such, the metallic sheaths 52 may include additives or impurities (e.g., alloying components, carbon, alkali metals, manganese, or similar compounds or elements) that may be selected to provide desired weld properties. In certain embodiments, the metallic sheath 52 may account for between approximately 80% and 90% of the total weight of the tubular welding wire 50. For example, in certain embodiments, the metallic sheath 52 may provide approximately 84% or approximately 86% of the total weight of the tubular welding wire 50.

In particular, in certain embodiments, the metallic sheath 52 of the tubular welding wire 50 may be a low-carbon strip that includes a relatively small (e.g., lower or reduced) amount of carbon. In general, the metallic sheath 52 may include less than approximately 0.1% carbon by weight. In certain embodiments, the metallic sheath 52 may include between approximately 0.01% and approximately 0.03% carbon by weight. For example, in certain embodiments, the metallic sheath 52 may include between approximately 0.005% and approximately 0.035%, between approximately 0.015% and approximately 0.025%, or approximately 0.02% carbon by weight. In certain embodiments, the metallic sheath 52 may include less than approximately 0.1%, less than approximately 0.08%, less than approximately 0.06%, less than approximately 0.05%, less than approximately 0.04%, or less than approximately 0.03% carbon by weight. Additionally, in certain embodiments, the metallic sheath 52 may be made of low-carbon steel generally having a small number of inclusions. For example, in certain embodiments, the metallic sheath 52 may include between approximately 0.25% and approximately 0.5%, or approximately 0.35% manganese by weight. By further example, in certain embodiments, the metallic sheath 52 may include less than approximately 0.02% phosphorus or sulfur by weight. The metallic sheath 52 may also include less than approximately 0.04% silicon by weight, less than approximately 0.05% aluminum by weight, less than approximately 0.1% copper by weight, and/or less than approximately 0.02% tin by weight.

The granular core 54 of the illustrated tubular welding wire 50 may generally be a compacted powder with a composition that, as discussed below, in certain embodiments, may include a carbon source and an alkali metal compound and/or an alkaline earth metal compound. In certain embodiments, the granular core 54 may account for between approximately 5% and 20% of the total weight of the tubular welding wire 50. For example, in certain embodiments, the granular core 54 may provide approximately 14%, approximately 15%, or approximately 16% of the total weight of the tubular welding wire 50. Furthermore, in certain embodiments, the carbon source, the alkali metal and/or alkaline earth metal compound, and/or other components (e.g., other fluxing or alloying components) may be homogenously or non-homogenously (e.g., in clumps or clusters 56) disposed within the granular core 54. Additionally, for certain welding electrode embodiments (e.g., a metal-cored welding electrode), the granular core 54 may include one or more metals (e.g., iron, iron titanium, iron silicon, or other alloys or metals) that may provide at least a portion of the filler metal for the weld.

Examples of components that may be present within the tubular welding wire 50 (i.e., in addition to the one or more carbon sources and the one or more alkali metal and/or alkali earth metal compounds) include other stabilizing, fluxing, and alloying components, such as may be found in METAL-LOY X-CEL™ welding electrodes available from Illinois Tool Works, Inc. Generally speaking, the total percentage of the combination of the one or more carbon sources and the one or more alkali metal and/or alkali earth metal compounds may be between approximately 0.01% and approximately 10% by weight, relative to the granular core 54 or the entire tubular welding wire 50. For example, in certain embodiments, the total percentage of the combination of the one or more carbon sources and the one or more alkali metal and/or alkali earth metal may be between approximately 0.01% and approximately 8%, between approximately 0.05% and approximately 5%, or between approximately 0.1% and approximately 4% of the granular core 54 or of the tubular welding wire 50 by weight. By specific example, in certain embodiments, the granular core 54 may include a carbon source and a potassium source that together account for approximately 10% or less of the granular core 54 by weight. It should be appreciated that, under the conditions of the arc 34, the components of the welding wire 50 (e.g., the metal sheath 52, the granular core 54, and so forth) may change physical state, chemically react (e.g., oxidize, decompose, and so forth), or become incorporated into the weld substantially unmodified by the weld process.

The carbon source present in the granular core 54 and/or the metal sheath 52 may be in a number of forms and may stabilize the arc 34 and/or increase the carbon content of the weld. For example, in certain embodiments, graphite, graphene, nanotubes, fullerenes and/or similar substantially $sp^2$-hybridized carbon sources may be utilized as the carbon source in the tubular welding wire 50. Furthermore, in certain embodiments, graphene or graphite may be used to also provide other components (e.g., moisture, gases, metals, and so forth) that may be present in the interstitial space between the sheets of carbon. In other embodiments, substantially $sp^3$-hybridized carbon sources (e.g., micro- or nano-diamond, carbon nanotubes, buckyballs) may be used as the carbon source. In still other embodiments, substantially amorphous carbon (e.g., carbon black, lamp black, soot, and/or similar amorphous carbon sources) may be used as the carbon source. Furthermore, while the present disclosure may refer to this component as a "carbon source," it should be appreciated that the carbon source may be a chemically modified carbon source that may contain elements other than carbon (e.g., oxygen, halogens, metals, and so forth). For example, in certain embodiments, the tubular welding wire 50 may include a carbon black carbon source (e.g., in the granular core 54 and/or the metallic sheath 52) that may contain a manganese content of approximately 20%. Additionally, in certain embodiments, the carbon source may account for between approximately 0.01% and 9.9%, between approximately 0.05% and 5%, between approximately 0.1% and 3%, between approximately 0.25% and 2%, between approximately 0.4% and 1%, or approximately 0.5% of the granular core 54 by weight.

Additionally, the tubular welding wire 50 may also include one or more alkali metal and/or alkaline earth metal compounds to stabilize the arc 34. That is, the granular core 54 and/or the metallic sheath 52 of the tubular welding wire 50 may include one or more compounds of the Group 1 and Group 2 elements, i.e., lithium (Li), sodium (Na), potassium (K), rubidium (Rb), cesium (Cs), beryllium (Be), magnesium (Mg), calcium (Ca), strontium (Sr), or barium (Ba). A non-limiting list of example compounds include: Group 1 (i.e., alkali metal) and Group 2 (i.e., alkaline earth metal) silicates, titanates, manganese titanate, alginates, carbonates, halides, phosphates, sulfides, hydroxides, oxides, permanganates, silicohalides, feldspars, pollucites, molybdenites, and molybdates. For example, in an embodiment, the granular core 54 of the tubular welding wire 50 may include potassium manganese titanate, potassium sulfate, sodium feldspar, potassium feldspar, and/or lithium carbonate. By specific example, the granular core 54 may include potassium silicate, potassium titanate, potassium alginate, potassium carbonate, potassium fluoride, potassium phosphate, potassium sulfide, potassium hydroxide, potassium oxide, potassium permanganate, potassium silicofluoride, potassium feldspar, potassium molybdates, or a combination thereof as the potassium source. In certain embodiments, the one or more alkali metal and/or alkaline earth metal compounds may include Group 1 and Group 2 salts of carboxymethyl cellulose (e.g., sodium carboxymethyl cellulose or potassium carboxymethyl cellulose). Similar examples of carbon sources and alkali metal compounds that may be used are described in U.S. Pat. No. 7,087,860, entitled "STRAIGHT POLARITY METAL CORED WIRES," and U.S. Pat. No. 6,723,954, entitled "STRAIGHT POLARITY METAL CORED WIRE," which are both incorporated by reference in their entireties for all purposes.

Furthermore, in certain embodiments, the alkali metal compound and/or alkaline earth metal compound stabilizers may be supplied by an agglomerate or frit source included in the granular core 54 of the tubular welding wire 50. That is, certain embodiments of the tubular welding wire 50 may include an agglomerate or frit including one or more alkali metal or alkaline earth metal compounds set forth above. The term "agglomerate" or "frit," as used herein, refers to a mixture of compounds that have been fired or heated in a calciner or oven such that the components of the mixture are in intimate contact with one another. It should be appreciated that the agglomerate may have subtly or substantially different chemical and/or physical properties than the individual components of the mixture used to form the agglomerate. For example, agglomerating the alkali metal or alkaline earth metal compounds, as presently disclosed, may provide an agglomerate that is better suited for the weld environment than the non-agglomerated alkali metal or alkaline earth metal compounds.

In certain embodiments, the granular core 54 of the tubular welding wire 50 may include an agglomerate of one or more alkali metal or alkaline earth metal compounds (e.g., potassium oxide, sodium oxide, calcium oxide, magnesium oxide, or other suitable alkali metal or alkaline earth metal compound). In other embodiments, the granular core 54 of the tubular welding wire 50 may include an agglomerate of a mixture of alkali metal or alkaline earth metal compound and other oxides (e.g., silicon dioxide, titanium dioxide, manganese dioxide, or other suitable metal oxides). For example, one embodiment of a tubular welding wire 50 may include an agglomerated potassium source including of a mixture of potassium oxide, silica, and titania. By further example, another embodiment of a tubular welding wire 50 may include in the granular core 54 another stabilizing agglomerate having a mixture of potassium oxide (e.g., between approximately 22% and 25% by weight), silica (e.g., between approximately 10% and 18% by weight), titania (e.g., between approximately 38% and 42% by weight), and manganese oxide or manganese dioxide (e.g., between approximately 16% and 22% by weight). In certain embodiments, an agglomerate may include between approximately 5% and 75% alkali metal and/or alkaline earth metal compound (e.g., potassium oxide, calcium oxide, magnesium oxide, or other suitable alkali metal and/or alkaline earth metal compound) by weight, or between approximately 5% and 95% alkali metal and/or alkaline earth metal (e.g., potassium, sodium, calcium, magnesium, or other suitable alkali metal and/or alkaline earth metal) by weight. Furthermore, in certain embodiments, other chemical and/or physical factors (e.g., maximizing alkali metal and/or alkaline earth metal loading, acidity, stability, and/or hygroscopicity of the agglomerate) may be considered when selecting the relative amounts of each component present in the agglomerate mixture. Additionally, in certain embodiments, the agglomerate may account for between approximately 0.01% and 9.9%, between approximately 0.05% and 5%, between approximately 0.1% and 4%, between approximately 1% and 3%, between approximately 1.5% and 2.5%, or approximately 2% of the granular core 54 by weight.

Additionally, the granular core 54 of the tubular welding wire 50 may also include other stabilizing components. Rare earth elements may generally provide stability to the arc 34 and may affect the properties of the resulting weld. For example, in certain embodiments, the tubular welding wire 50 may use rare earth silicides, such as the Rare Earth Silicide (e.g., available from Miller and Company of Rosemont, Ill.), which may include rare earth elements (e.g., cerium). Furthermore, the tubular welding wire 50 may, additionally or alternatively, include other elements and/or minerals to provide arc stability and to control the chemistry of the resulting weld. For example, in certain embodiments, the granular core 54 and/or the metallic sheath 52 of the tubular welding wire 50 may include certain elements (e.g., titanium, manganese, zirconium, fluorine, or other elements) and/or minerals (e.g., pyrite, magnetite, and so forth). By specific example, certain embodiments may include zirconium silicide, nickel zirconium, or alloys of titanium, aluminum, and/or zirconium in the granular core 54. In particular, sulfur containing compounds, including various sulfide, sulfate, and/or sulfite compounds (e.g., such as molybdenum disulfide, iron sulfide, manganese sulfite, barium sulfate, calcium sulfate, or potassium sulfate) or sulfur-containing compounds or minerals (e.g., pyrite, gypsum, or similar sulfur-containing species) may be included in the granular core 54 to improve the quality of the resulting weld by improving bead shape and facilitating slag detachment, which may be especially useful when welding galvanized workpieces, as discussed below. Furthermore, in certain embodiments, the granular core 54 of the tubular welding wire 50 may include multiple sulfur sources (e.g., manganese sulfite, barium sulfate, and pyrite), while other embodiments of the tubular welding wire 50 may include only a single sulfur source (e.g., pyrite or iron sulfide) without including a substantial amount of another sulfur source (e.g., potassium sulfate).

Generally speaking, the tubular welding wire 50 may generally stabilize the formation of the arc 34 to the workpiece 22. As such, the disclosed tubular welding wire 50 may improve deposition rates while reducing splatter during the welding process. It should further be appreciated that the improved stability of the arc 34 may generally enable the welding of coated metal workpieces and thinner workpieces. A non-limiting list of example coated workpieces includes painted, sealed, galvanized, galvanealed, (or similar zinc-coated workpieces), plated (e.g., nickel-plated, copper-plated, tin-plated, or electroplated or chemically plated using a similar metal), chromed, nitrite-coated, aluminized, or carburized workpieces. For example, in the case of galvanized workpieces, the presently disclosed tubular welding wire 50 may generally improve the stability and control the penetration of the arc 34 such that a good weld may be achieved despite the zinc coating on the outside of the workpiece 22. Additionally, by improving the stability of the arc 34, the disclosed tubular welding wire 50 may generally enable the welding of thinner workpieces than may be possible using other welding electrodes. For example, in certain embodiments, the disclosed tubular welding wire 50 may be used to weld metal having an approximately 16-, 18-, 20-, 22-, 24-gauge, or even thinner workpieces. It should be appreciated that, for certain embodiments of the tubular welding wire 50, the lower carbon content of the metallic sheath 52 may enable reduced penetration into the surface of the workpiece 22 during welding.

Furthermore, the presently disclosed tubular welding wire 50 enables welding (e.g., welding of thin gauge galvanized steels) at travel speeds in excess of 30 inches per minute. For example, the tubular welding wire 50 readily enables high quality fillet welds at travel speeds above 30 inches per minute (e.g., 35 or 40 inches per minute) with low porosity. That is, the presently disclosed tubular welding wire 50 may enable higher (e.g., 50% to 75% higher) travel speeds than other solid-cored, metal-cored, or flux-cored welding wires. It should be appreciated that higher travel speeds may enable higher production rates (e.g., on a production line) and reduce costs. Additionally, the presently disclosed tubular welding wire 50 exhibits good gap handling and provides excellent weld properties (e.g., strength, ductability, appearance, and so forth) using a wide operating process window. Further, the tubular welding wire 50 generally produces less smoke and spatter than other solid-cored, metal-cored, or flux-cored welding wires.

Furthermore, the disclosed tubular welding wire 50 may also be combined with certain welding methods or techniques (e.g., techniques in which the welding electrode moves in a particular manner during the weld operation) that may further increase the robustness of the welding system 10 for particular types of workpieces. For example, in certain embodiments, the welding torch 18 may be configured to cyclically or periodically move the electrode in a desired pattern (e.g., a circular, spin arc, or serpentine pattern) within the welding torch 18 in order to maintain an arc 34 between the tubular welding wire 50 and the workpiece 22 (e.g., only between the sheath 52 of the tubular welding wire 50 and the workpiece 22). By specific example, in certain embodiments, the disclosed tubular welding wire 50 may be utilized with welding methods such as those described in provisional U.S. Patent Application Ser. No. 61/576,850, entitled "DC ELECTRODE NEGATIVE ROTATING ARC WELDING METHOD AND SYSTEM," which is incorporated by reference herein in its entirety for all purposes. It should be appreciated that such welding techniques may be especially useful when welding thin workpieces (e.g., having 20-, 22-, or 24-gauge thickness), as mentioned above.

Figure 3:
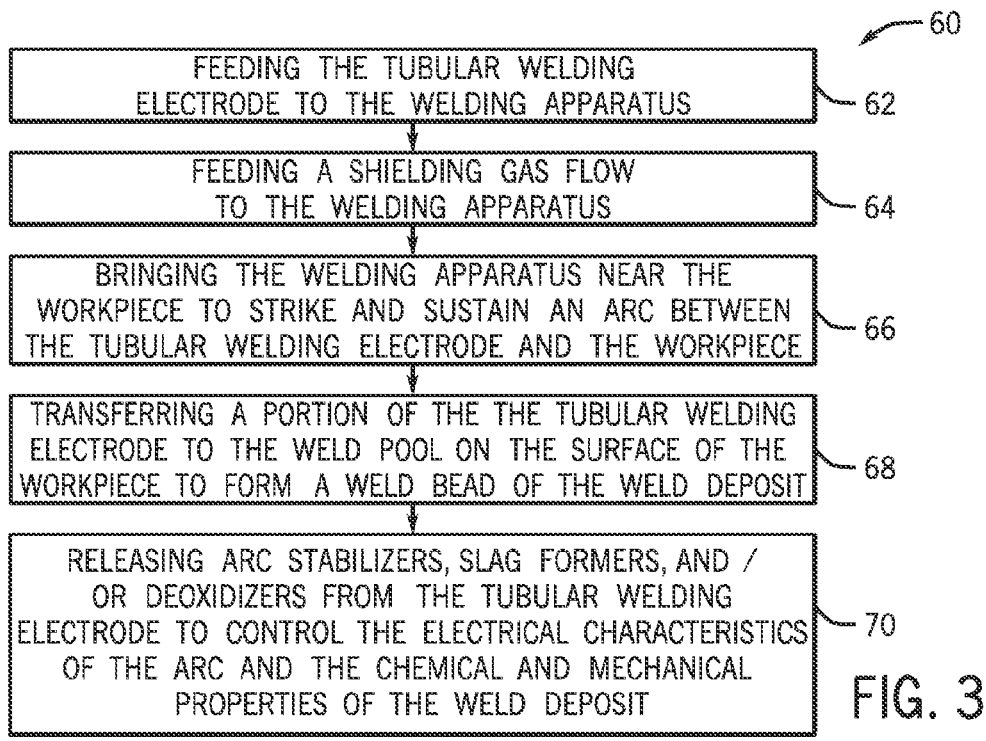
FIG. 3 is a process by which the tubular welding electrode may be used to weld a workpiece, in accordance with embodiments of the present disclosure.

FIG. 3 illustrates an embodiment of a process 60 by which a workpiece 22 may be welded using the disclosed welding system 10 and tubular welding wire 50. The illustrated process 60 begins with feeding (block 62) the tubular welding electrode 50 (i.e., the tubular welding wire 50) to a welding apparatus (e.g., welding torch 18). In particular, in certain embodiments, the tubular welding electrode 50 may include a metal sheath 52 having between approximately 0.01% and approximately 0.03% carbon by weight. Additionally, the process 60 includes providing (block 64) a shielding gas flow (e.g., 100% argon, 100% carbon dioxide, 75% argon/25% carbon dioxide, 90% argon/10% helium, or similar shielding gas flow) near the contact tip of the welding apparatus (e.g., the contact tip of the torch 18). In other embodiments, welding systems may be used that do not use a gas supply system (e.g., such as the gas supply system 16 illustrated in FIG. 1) and one or more components (e.g., potassium carbonate) of the tubular welding electrode 50 may decompose to provide a shielding gas component (e.g., carbon dioxide).

Next, the tubular welding electrode 50 may be brought near (block 66) the workpiece 22 to strike and sustain an arc 34 between the tubular welding wire 50 and the workpiece 22. It should be appreciated that the arc 34 may be produced using, for example, a DCEP, DCEN, DC variable polarity, pulsed DC, balanced or unbalanced AC power configuration for the GMAW system 10. Once the arc 34 has been established to the workpiece 22, a portion of the tubular welding electrode 50 (e.g., filler metals and alloying components) may be transferred (block 68) into the weld pool on the surface of the workpiece 22 to form a weld bead of a weld deposit. Meanwhile, the remainder of the components of the tubular welding electrode 50 may be released (block 70) from the tubular welding electrode 50 to serve as arc stabilizers, slag formers, and/or deoxidizers to control the electrical characteristics of the arc and the resulting chemical and mechanical properties of the weld deposit. Additionally, in certain embodiments, the tubular welding electrode 50 and/or the cyclical motion of the tubular welding electrode 50 during welding may generally enable the welding of thinner (e.g., less than 20 gauge) workpieces as well as painted, galvanized, galvanealed, plated, aluminized, chromed, carburized, or other similar coated workpieces.

Figure 4:
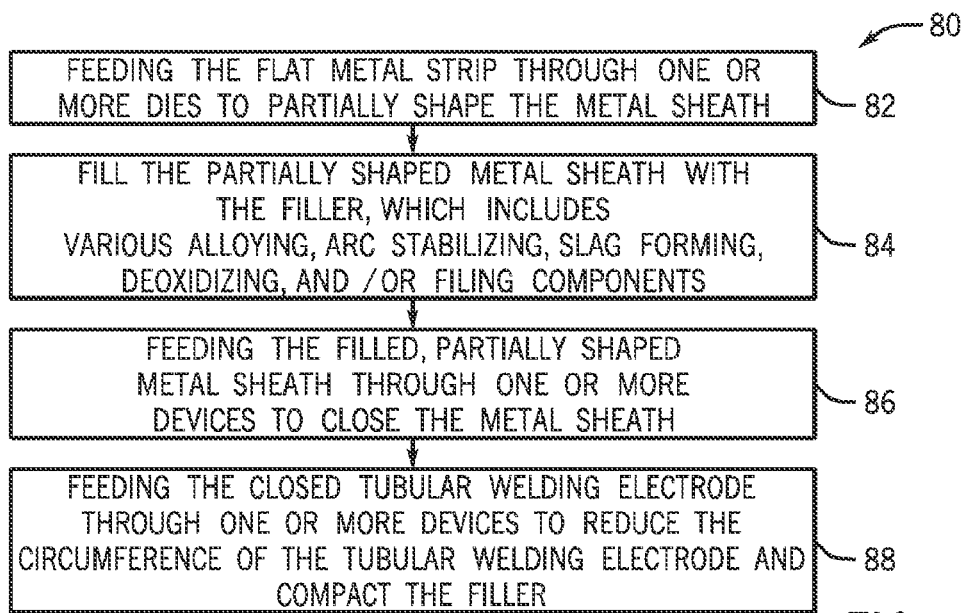
FIG. 4 is a process for manufacturing the tubular welding electrode, in accordance with embodiments of the present disclosure.

FIG. 4 illustrates an embodiment of a process 80 by which the tubular welding wire 50 may be manufactured. The process 80 begins with a flat metal strip being fed (block 82) through a number of dies that shape the strip into a partially circular metal sheath 52 (e.g., producing a semicircle or trough). In particular, in certain embodiments, the metal strip may be a low-carbon metal strip having between approximately 0.01% and approximately 0.03% carbon by weight. After the metal strip has been at least partially shaped into the metal sheath 52, it may be filled (block 84) with the filler (e.g., the granular core 54). That is, the partially shaped metal sheath 52 may be filled with various powdered alloying, arc stabilizing, slag forming, deoxidizing, and/or filling components. More specifically, among the various fluxing and alloying components, one or more carbon sources and one or more alkali metal and/or alkaline earth metal compounds may be added such that together they comprise less than 10% of the tubular welding wire 50 and/or the granular core material 54. Furthermore, in certain embodiments, other components (e.g., rare earth silicide, magnetite, titanate, pyrite, iron powders, and/or other similar components) may also be added to the partially shaped metal sheath 52.

Next in the illustrated process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). Additionally, the closed metal sheath 52 may subsequently be fed through (block 88) a number of devices (e.g., drawing dies or other suitable devices) to reduce the circumference of the tubular welding wire 50 by compressing the granular core material 54.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tubular welding wire, comprising:
a sheath and a core, wherein the sheath comprises less than approximately 0.1% carbon by weight, and wherein the core comprises a carbon source and one or more arc stabilizers that together comprise less than approximately 10% of the core by weight, wherein the one or more arc stabilizers include an agglomerate that comprises between approximately 22% and approximately 25% potassium oxide by weight, between approximately 10% and approximately 18% silicon oxide by weight, between approximately 38% and approximately 42% titanium oxide by weight, and between approximately 16% and approximately 22% manganese oxide or manganese dioxide by weight.

2. The tubular welding wire of claim 1, wherein the one or more arc stabilizers comprise a Group 1 or Group 2 compound, wherein the Group 1 or Group 2 compound comprises a silicate, titanate, carbonate, fluoride, phosphate, sulfide, hydroxide, oxide, permanganate, silicofluoride, feldspar, molybdates, or a combination thereof.

3. The tubular welding wire of claim 1, wherein the carbon source comprises graphite, carbon black, lamp black, carbon nanotubes, diamond, or a combination thereof.

4. The tubular welding wire of claim 1, wherein the core comprises sodium carboxymethyl cellulose, or potassium carboxymethyl cellulose, or a combination thereof.

5. The tubular welding wire of claim 1, wherein the core comprises cerium silicide.

6. The tubular welding wire of claim 1, wherein the tubular welding wire comprises between approximately 5% and 20% core by weight.

7. A welding method, comprising:
feeding a welding wire electrode into a welding apparatus, wherein the welding wire electrode comprises a core and a sheath, wherein the sheath comprises less than approximately 0.1% carbon by weight, and wherein the core comprises a carbon source and one or more arc stabilizers that together comprise less than approximately 10% of the core by weight, wherein the one or more arc stabilizers include an agglomerate that comprises between approximately 22% and approximately 25% potassium oxide by weight, between approximately 10% and approximately 18% silicon oxide by weight, between approximately 38% and approximately 42% titanium oxide by weight, and between approximately 16% and approximately 22% manganese oxide or manganese dioxide by weight; and
forming a welding arc between the welding wire electrode and a coated metal workpiece, wherein the coated metal workpiece comprises a coating layer, and wherein the core of the welding wire electrode stabilizes the welding arc and enables the welding arc to penetrate the coating layer to reach the coated metal workpiece without penetrating through the thickness of the coated metal workpiece.

8. The method of claim 7, wherein the coated metal workpiece comprises a galvanized or galvanealed workpiece that comprises a zinc coating layer.

9. The method of claim 7, wherein the coated metal workpiece comprises a metal workpiece that has been painted, plated, chromed, aluminized, carburized, nitrite-coated, or a combination thereof, to form the coating layer.

10. The method of claim 7, wherein the thickness of the coated metal workpiece is 16 gauge or less, and wherein the welding arc does not penetrate through the thickness of the coated metal workpiece.

11. The method of claim 7, wherein the thickness of the coated metal workpiece is 20 gauge or less, and wherein the welding arc does not penetrate through the thickness of the coated metal workpiece.

12. The method of claim 7, wherein the thickness of the coated metal workpiece is 22 gauge or less, and wherein the welding arc does not penetrate through the thickness of the coated metal workpiece.

13. The method of claim 7, comprising forming a weld deposit on the coated metal workpiece at a travel speed greater than 30 inches per minute.

14. The tubular welding wire of claim 1, wherein the core comprises between approximately 1% and approximately 3% of the agglomerate by weight.

15. The tubular welding wire of claim 1, wherein the core comprises approximately 2% of the agglomerate by weight.

16. The tubular welding wire of claim 1, wherein the one or more arc stabilizers comprise a Group 1 or Group 2 compound.

17. The tubular welding wire of claim 1, wherein the one or more arc stabilizers comprise cesium.

18. The tubular welding wire of claim 1, wherein the one or more arc stabilizers comprise a Group 1 or Group 2 alginate.

\* \* \* \* \*